(12) United States Patent
Endoh et al.

(10) Patent No.: US 11,097,532 B2
(45) Date of Patent: Aug. 24, 2021

(54) METHOD FOR MAKING MOLD, METHOD FOR MOLDING MODEL MATERIAL, AND MOLD MAKING APPARATUS

(71) Applicant: RICOH COMPANY, LTD., Tokyo (JP)

(72) Inventors: Yuuya Endoh, Kanagawa (JP); Shinji Ohtani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 757 days.

(21) Appl. No.: 15/405,515

(22) Filed: Jan. 13, 2017

(65) Prior Publication Data

US 2017/0217090 A1    Aug. 3, 2017

(30) Foreign Application Priority Data

Feb. 1, 2016   (JP) .............................. JP2016-017540
Dec. 6, 2016   (JP) .............................. JP2016-236881

(51) Int. Cl.
  *B29C 64/194*   (2017.01)
  *B29C 64/106*   (2017.01)
  (Continued)

(52) U.S. Cl.
  CPC ............ *B33Y 80/00* (2014.12); *B29C 64/106* (2017.08); *B29C 64/112* (2017.08);
  (Continued)

(58) Field of Classification Search
  None
  See application file for complete search history.

(56) References Cited

U.S. PATENT DOCUMENTS 6,129,872 A * 10/2000 Jang ..................... B29C 41/36
                                                         264/75
6,180,186 B1 *  1/2001 Choy .................... B29C 64/135
                                                         427/510
(Continued)

FOREIGN PATENT DOCUMENTS

JP   10-101518      4/1998
JP   2006-028604    2/2006
(Continued)

OTHER PUBLICATIONS

Muller, Michael, "Printing Thermoresponsive Reverse Molds for the Creation of Patterned Two-Component Hydrogels for 3D Cell Culture", Published Jul. 10, 2013, Journal of Visualized Experiments, (77). (Year: 2013).*

(Continued)

*Primary Examiner* — Timothy Kennedy
*Assistant Examiner* — Sonny V Nguyen
(74) *Attorney, Agent, or Firm* — Grüneberg and Myers PLLC

(57) ABSTRACT

A method for making a mold is provided. The method includes the following steps a) to d): a) in which a polymer solution is discharged from a liquid droplet discharger onto a stage, where the polymer solution is capable of solating at a temperature lower than a sol-gel transition temperature and gelating at a temperature higher than the sol-gel transition temperature; b) in which the polymer solution discharged onto the stage is maintained at a temperature higher than the sol-gel transition temperature; c) in which the liquid droplet discharger and the stage are relatively moved to form a gel layer on the stage, where the gel layer has a shape corresponding to a locus of the relative movement; and d) in which the polymer solution is discharged from the liquid (Continued)

droplet discharger onto the gel layer to laminate another gel layer thereon and obtain a laminated object.

11 Claims, 8 Drawing Sheets

(51) Int. Cl.
- *B33Y 80/00* (2015.01)
- *B33Y 10/00* (2015.01)
- *B29C 64/112* (2017.01)
- *B29C 64/188* (2017.01)
- *B29C 64/118* (2017.01)
- B29K 105/00 (2006.01)
- B29K 105/16 (2006.01)
- B29L 31/00 (2006.01)
- B29C 64/40 (2017.01)
- B29C 64/30 (2017.01)

(52) U.S. Cl.
CPC .......... *B29C 64/118* (2017.08); *B29C 64/188* (2017.08); *B29C 64/194* (2017.08); *B33Y 10/00* (2014.12); *B29C 64/30* (2017.08); *B29C 64/40* (2017.08); *B29K 2105/0061* (2013.01); *B29K 2105/16* (2013.01); *B29L 2031/757* (2013.01)

(56) References Cited

U.S. PATENT DOCUMENTS

| | | | | |
|---|---|---|---|---|
| 2003/0107158 A1* | 6/2003 | Levy | ......... | B29C 67/24 264/494 |
| 2008/0169585 A1* | 7/2008 | Zinniel | ......... | B33Y 40/00 264/401 |
| 2013/0186549 A1* | 7/2013 | Comb | ......... | B29C 64/147 156/62.8 |
| 2015/0037445 A1* | 2/2015 | Murphy | ......... | C12M 41/00 425/131.1 |
| 2015/0165675 A1* | 6/2015 | Dawson | ......... | B29C 64/214 264/401 |
| 2016/0108522 A1* | 4/2016 | Donovan | ......... | B33Y 40/00 427/248.1 |
| 2016/0221261 A1* | 8/2016 | Yamamoto | ......... | B29C 64/40 |
| 2016/0263822 A1* | 9/2016 | Boyd, IV | ......... | B33Y 10/00 |
| 2016/0272817 A1* | 9/2016 | Naruse | ......... | B29C 64/165 |
| 2016/0287756 A1* | 10/2016 | Lewis | ......... | B29C 64/40 |
| 2016/0288414 A1* | 10/2016 | Ozbolat | ......... | B41J 3/407 |

FOREIGN PATENT DOCUMENTS

| | | | |
|---|---|---|---|
| JP | 2008-120886 | 5/2008 | |
| JP | 2008-280412 | 11/2008 | |
| JP | 2013-116045 | 6/2013 | |
| JP | 2013-542728 | 11/2013 | |
| JP | 2014-151524 A | 8/2014 | |
| JP | 2007-002063 A | 1/2017 | |
| WO | WO 2007/077731 A1 | 7/2007 | |
| WO | WO 2012/054195 A2 | 4/2012 | |
| WO | WO 2015/190168 A1 | 12/2015 | |
| WO | WO-2017113180 A1 * | 7/2017 | ............. B33Y 80/00 |

OTHER PUBLICATIONS

Office Action dated Nov. 4, 2020, in corresponding Japanese Patent Application No. 2016-236881, 3 pages.

* cited by examiner

METHOD FOR MAKING MOLD, METHOD FOR MOLDING MODEL MATERIAL, AND MOLD MAKING APPARATUS

CROSS-REFERENCE TO RELATED APPLICATIONS

This patent application is based on and claims priority pursuant to 35 U.S.C. § 119(a) to Japanese Patent Application Nos. 2016-017540 and 2016-236881, filed on Feb. 1, 2016 and Dec. 6, 2016, respectively, in the Japan Patent Office, the entire disclosure of each of which is hereby incorporated by reference herein.

BACKGROUND.

Technical Field

The present disclosure relates to a method for making a mold, a method for molding a model material, and a mold making apparatus.

Description of the Related Art

Molding a brittle material, such as hydrogel and biomaterial, into a three-dimensional object with a conventional metallic or plastic mold has two major drawbacks.

The first drawback is poor on-demand property. Prior to formation of a mold, a raw material of the mold, such as a metal and plastic, should be subject to a cutting process. In addition, a new mold is required every time a target shape of the molded object is changed, requiring another cutting process.

The second drawback is that a load is applied to the molded object when the molded object is released from the mold. In a case in which the molded object is a gel, the gel is released from the mold while generating a friction between the inner wall surface of the mold, resulting in destruction of the molded object.

SUMMARY

In accordance with some embodiments of the present invention, a method for making a mold is provided. The method includes step a) in which a polymer solution is discharged from a liquid droplet discharger onto a stage. The polymer solution is capable of solating at a temperature lower than a sol-gel transition temperature and gelating at a temperature higher than the sol-gel transition temperature. The method further includes step b) in which the polymer solution discharged onto the stage is maintained at a temperature higher than the sol-gel transition temperature. The method further includes step c) in which the liquid droplet discharger and the stage are relatively moved to form a gel layer on the stage. The gel layer has a shape corresponding to a locus of the relative movement. The method further includes step d) in which the polymer solution is discharged from the liquid droplet discharger onto the gel layer to laminate another gel layer thereon and obtain a laminated object.

In accordance with some embodiments of the present invention, a method for molding a model material is provided. The method includes: making a mold by the above method for making a mold; injecting a model material in a liquid state into the mold; solidifying the model material; and releasing the solidified model material from the mold.

In accordance with some embodiments of the present invention, a mold making apparatus is provided. The mold making apparatus includes an additive manufacturing device including a liquid droplet discharger, a stage, and a driver. The liquid droplet discharger is configured to discharge a polymer solution solating at a temperature lower than a sol-gel transition temperature and gelating at a temperature higher than the sol-gel transition temperature. The stage is configured to receive the polymer solution discharged from the liquid droplet discharger. The driver is configured to relatively move the liquid droplet discharger and the stage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
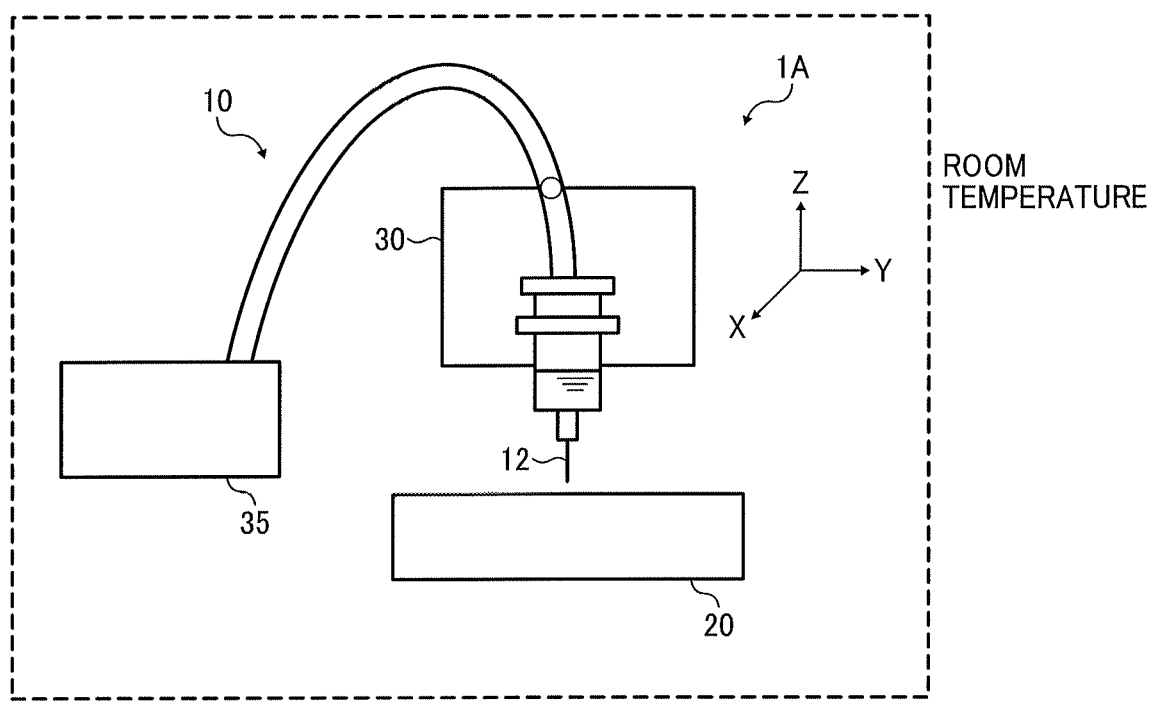
FIG. 1 is a schematic view of an additive manufacturing device that performs a method for making a mold according to a first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a method for making a mold is provided that can mold brittle materials into three-dimensional objects on demand and can release the three-dimensional objects with small load.

In the method for making a mold according to some embodiments of the present invention, a mold is made from a sol-gel transition material. The method has variations depending on whether the sol-gel transition temperature of the sol-gel transition material is higher or lower than the room temperature of a space within which an additive manufacturing device that makes the mold is put into operation.

When the sol-gel transition temperature is lower than the room temperature, a mold is formed by discharging a polymer solution (i.e., a solution of the sol-gel transition material, to be described in detail later) in a gel state. When the sol-gel transition temperature is higher than the room temperature, a mold is formed by discharging a polymer solution in a sol state. Thus, a mold can be faulted by discharging a polymer solution either in a sol state or in a gel state.

When the sol-gel transition temperature is higher than the room temperature, preferably, a stage of the additive manufacturing device and peripheral atmosphere thereof are maintained at a temperature equal to or higher than the sol-gel transition temperature, to prevent the polymer solution in a gel state from solating in the process of forming the mold. A proper temperature control can be performed by, for example, heating the stage and a syringe pump in the additive manufacturing device with a Peltier element, or performing additive manufacturing in a thermostatic chamber under application of heat.

Preferably, the room temperature of the space within which the additive manufacturing device is put into operation is in the range of from 15° C. to 25° C. In the embodiments described below, the additive manufacturing device is operated under a room temperature of 20° C. only for the purpose of illustration.

First Embodiment

In the first embodiment, a mold is made from a polymer solution having a sol-gel transition temperature lower than the room temperature. The polymer solution is in a gel state when being discharged.

A mold making apparatus according to the first embodiment includes an additive manufacturing device and a laminated object cooler.

FIG. 1 is a schematic view of an additive manufacturing device 1A that performs a method for making a mold according to the first embodiment of the present invention.

The additive manufacturing device 1A includes a liquid droplet discharge unit 10, a stage 20, and a driver 30. The liquid droplet discharge unit 10 includes a liquid droplet discharger 12 for discharging a polymer solution onto the stage 20. The driver 30 relatively moves the liquid droplet discharger 12 and the stage 20.

The liquid droplet discharge unit 10 performs mechanical extrusion or electrostatic discharge with, for example, a pneumatic dispenser and/or a syringe pump. In the present embodiment, the liquid droplet discharge unit 10 includes a pneumatic dispenser 35 and the liquid droplet discharger 12 serving as a syringe pump.

The stage 20 has a flat upper surface. The stage 20 is made of any material to which the polymer solution can adhere. Specific examples of such materials include metal, glass, and plastic films The driver 30 moves at least one of the liquid droplet discharger 12 and the stage 20 such that the liquid droplet discharger 12 and the stage 20 are three-dimensionally moved relative to each other. That is, with movement of at least one of the liquid droplet discharger 12 and the stage 20, the relative positions of the liquid droplet discharger 12 and the stage 20 are changed. The driver 30 generates a drive force with a motor or from air pressure. Specific examples of the motor include, but are not limited to, a ball screw and a belt-driving actuator. The air pressure can be extracted from, for example, a pneumatic cylinder. The configuration of the driver 30 is not limited thereto.

The laminated object cooler is described in detail below.

In the process of making a mold by means of additive manufacturing, level differences between laminated layers may appear on the surface of the mold. To prevent such level differences of the mold from being transferred to a model material, a part of the mold can be made into a sol to remove the level differences of the mold.

In the present disclosure, "model material" refers to a liquid material to be injected into a mold and hardened in the mold, and a solid molded object of such a liquid material taken out of the mold.

Figure 2:
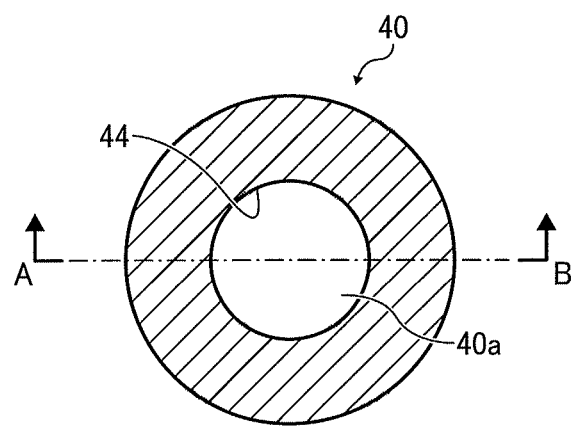
FIG. 2 is a top plan view of a laminated object formed by a method for making a mold according to some embodiments of the present invention.
Figure 3:
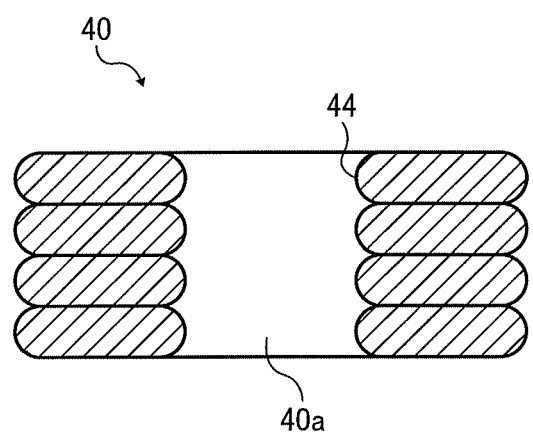
FIG. 3 is a cross-sectional view taken from line A-B in FIG. 2.
Figure 4:
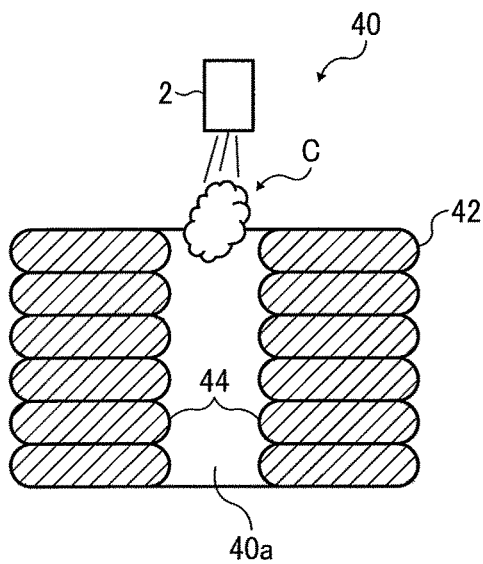
FIG. 4 is an illustration of a process of removing level differences between laminated layers on the inner wall surface of a laminated object.

FIG. 2 is a top plan view of a three-dimensional modeled object (hereinafter "laminated object") 40 of a gel, formed by the additive manufacturing device 1A. FIG. 3 is a cross sectional view taken from a line A-B in FIG. 3. FIG. 4 is an illustration of a process in which a laminated object cooler 2 temporarily cools a surface of the laminated object 40 to the sol-gel transition temperature or lower, to remove level differences on the surface of the laminated object 40. The laminated object cooler 2 may cool the laminated object 40 by, for example, blowing cold air or pressing a cooled trowel thereto. Alternatively, the laminated object cooler 2 is served as a refrigerator.

When the surface of the laminated object 40 has a complicated structure and needs local cooling, preferably, the laminated object cooler 2 blows cold air C, which can cool the surface locally without contacting the surface. The cold air C can be generated by, for example, a jet cooler using a compressed air.

The polymer solution has a specific sol-gel transition temperature and a sol-gel transition time within 10 minutes. If the polymer solution remains cooled to the sol-gel transition temperature or lower for too long a time, the laminated object 40 will entirely solate and the structure thereof will collapse. Therefore, preferably, the laminated object cooler 2 is put into operation within the range of 5 seconds to 10 minutes. More preferably, the operation time of the laminated object cooler is within the range of 10 seconds to 5 minutes.

To complete solation of the surface of the laminated object 40 of a gel within the above time period, preferably, the cooling temperature is lower than the sol-gel transition temperature by 5° C. or more.

The polymer solution is described in detail below.

The polymer solution serves as a mold-forming material. The polymer solution solates at a temperature lower than the sol-gel transition temperature and gelates at a temperature higher than the sol-gel transition temperature.

Specifically, the polymer solution is an aqueous solution of a hydrogel-forming polymer having a specific temperature responsiveness in which solation occurs at a temperature lower than the sol-gel transition temperature and gelation occurs at a temperature higher than the sol-gel transition temperature. The aqueous solution itself serves as a temperature-responsive sol-gel transition material.

Specific examples of such a hydrogel-forming polymer include, but are not limited to, methyl cellulose, 8-arms PEG-block-PLLA-cholesterol conjugate, poly[(Glc-Asp)-r-DL-LA]-g-PEG, and poloxamer 407 available under the trade name of PLURONIC F127 or KOLLIPHOR P407.

Among these materials, poloxamer 407 (hereinafter simply "poloxamer") is preferable since an aqueous solution thereof is capable of undergoing sol-gel transition at around room temperature. In addition, poloxamer 407 is easily available.

In a case in which a poloxamer aqueous solution is used as the polymer solution having a specific sol-gel transition temperature, the sol-gel transition temperature can be adjusted by adjusting the concentration of the poloxamer.

For example, when the concentration of the poloxamer is 20% by weight, the sol-gel transition temperature becomes around 20° C. When the concentration of the poloxamer is 15% by weight, the sol-gel transition temperature becomes around 30° C. As another example, when sodium chloride is added to a poloxamer aqueous solution having a concentration of 25% by weight and a sol-gel transition temperature of around 15° C., the sol-gel transition temperature is adjusted to around 5° C. to 10° C.

Thus, it is possible to make the sol-gel transition temperature of the poloxamer aqueous solution lower than the molding temperature of a model material by varying the concentration of poloxamer and the types of additives.

As another example, an aqueous solution of a combination of methyl cellulose and sorbitol, both generally used as food additives, having a sol-gel transition temperature of less than 40° C. is also preferable, for its availability.

In the present disclosure, a hydrogel of such a temperature-responsive hydrogel-forming polymer may be referred to as "mold-forming gel" or simply "gel".

A method for making a mold, that is a cylindrical laminated object 40 made of a mold-forming gel, is described in detail below. The mold is a three-dimensional object having a hollow or depression that is in communication with the surface of the mold. More specifically, the mold may be in the shape of a box, a cup, or a quadrangular prism or sphere having a hollow or depression on the surface thereof, but is not limited thereto.

First, the liquid droplet discharger 12 is filled with a polymer solution in a gel state at room temperature, and next, the following processes are performed.

Process 1: The polymer solution is discharged from the liquid droplet discharger 12 onto the stage 20. At this time, the stage 20 has a temperature higher than the sol-gel transition temperature of the polymer solution. The liquid droplet discharger 12 may discharge the polymer solution in a gel state at a temperature equal to or higher than the sol-gel transition temperature. Alternatively, the liquid droplet discharger 12 may discharge the polymer solution in a sol state at a temperature lower than the sol-gel transition temperature, and the discharged polymer solution may be heated on the stage 20 to gelate.

Process 2: The liquid droplet discharger 12 and the stage 20 are relatively moved in a horizontal direction by the driver 30.

Process 3: A layer of a mold-forming gel, having a shape corresponding to a locus of the relative movement, is formed on the stage 20.

Process 4: The driver 30 is operated such that the polymer solution is further discharged onto the layer of the mold-forming gel to laminate another layer of the mold-forming gel. Each layer of the mold-forming gel includes a portion where nothing is formed, as the polymer solution is not discharged to a specified region inside the outer periphery of each layer, when forming each layer of the mold-forming gel.

As the processes 1 to 4 are repeated, multiple layers of the mold-forming gel are laminated on one another, thereby forming a laminated object of the mold-forming gel, i.e., a mold.

A top plan view of the laminated object is illustrated in FIG. 2, and a cross-sectional view of the laminated object, taken from line A-B in FIG. 2, is illustrated in FIG. 3.

The configurations of the liquid droplet discharger 12, the driver 30, and the stage 20 are not limited to those described above so long as a mold can be formed by means of additive manufacturing.

In the process of making a mold by means of additive manufacturing, level differences between laminated layers may appear on the surface of the mold. To prevent such level differences of the mold from being transferred to a model material, a process of removing the level differences of the mold may be further performed. Such a process may include temporarily cooling the laminated object 40 of the mold-forming gel each time after each layer is laminated and/or after multiple layers have been laminated. In particular, the level differences of the mold can be removed by temporarily making a surface part of the mold into a sol of the temperature-responsive hydrogel, so that the sol can fill the level differences of the mold.

One method for temporarily cooling the laminated object 40 of the mold-forming gel is described below.

First, the laminated object 40 of the mold-forming gel formed by the additive manufacturing device 1A is maintained at the sol-gel transition temperature or higher on the stage 20.

Next, the laminated object cooler 2 temporarily cools a surface part of the laminated object 40 of the mold-forming gel to the sol-gel transition temperature or lower. As a result, the surface part of the laminated object 40 is made into a sol. The solated surface part flows downward by gravity and fills the level differences between the laminated layers of the mold-forming gel.

The laminated object 40 of the mold-forming gel is reheated to a temperature higher than the sol-gel transition temperature, so that the solated surface part of the laminated object 40 becomes a gel again. Thus, the level differences between the laminated layers are removed.

Here, "temporarily" refers to a time period within the range of 5 seconds to 10 minutes, preferably, within the range of 10 seconds to 5 minutes. The cooling temperature is 0° C. or higher and lower than the sol-gel transition temperature by 5° C. or more. Since the laminated object 40 is used as a mold, at least level differences on the inner wall surface is removed. Of course, it is possible to remove level differences on all the wall surfaces of the laminated object 40.

The temporal cooling may be performed each time after each layer is laminated and/or after multiple layers have been laminated.

Another method for temporarily cooling the laminated object 40 to remove level differences on the inner wall surface, using cold air, is described below.

FIG. 4 is an illustration of a process of removing level differences on the inner wall surface of the laminated object 40 with cold air.

Level differences between layers can be removed through the following processes A to F.

Process A: Cold air is blown into an inner hollow 40a of the laminated object 40 from up above.

Process B: The temperature of the mold-forming gel at the surface of an inner wall 44 of the laminated object 40 is reduced, and the mold-forming gel at the surface of the inner wall 44 becomes a sol.

Process C: The resulting sol, i.e., the polymer solution, flows into the level difference between a lower layer.

Process D: Blowing cold air is stopped.

Process E: The laminated object 40 is heated and maintained at a temperature equal to or higher than the sol-gel transition temperature.

Process F: The sol, i.e., the polymer solution is made into a gel again.

Thus, the level differences on the inner wall 44 of the laminated object 40 are removed through the processes A to F.

In the present embodiment, since only the surface part of the laminated object 40 is subjected to solation, preferably, the time for blowing cold air through the processes A to D is within the range of 5 seconds to 10 minutes. When the laminated object 40 is exposed to cold air for more than 10 minutes, the entire laminated object 40 is so cooled that the solated structure thereof may be destroyed. The cooling time is not limited to that described above, and is variable depending on the type of the polymer solution and the size of the laminated object 40.

Figure 5:
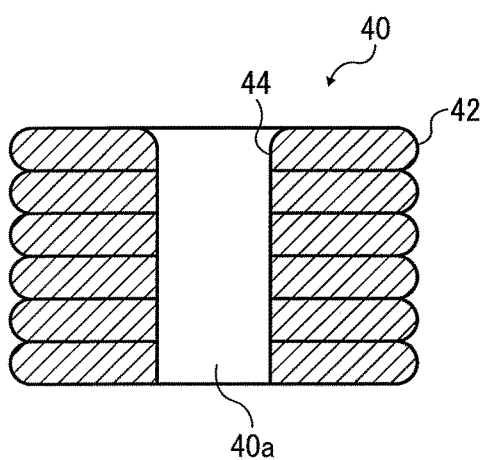
FIG. 5 is a cross-sectional view of the laminated object illustrated in FIG. 4 from which level differences between laminated layers on the inner wall surface have been removed.

FIG. 5 is a cross-sectional view of the laminated object 40 from which level differences between layers 42 on the inner wall 44 have been removed through the above processes A to F.

Figure 6:
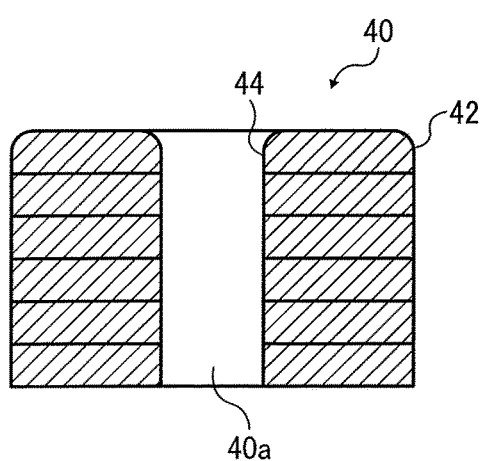
FIG. 6 is a cross-sectional view of the laminated object illustrated in FIG. 4 from which level differences between laminated layers on all the wall surfaces have been removed.

FIG. 6 is a cross-sectional view of the laminated object 40 from which level differences between layers 42 on all the wall surfaces have been removed by exposing the entire laminated object 40 to cold air.

A method for evaluating the degree of level difference of the mold prepared by the above method is described below.

Specifically, the degree of level difference of the mold is evaluated through the following processes 1 to 4, after level differences generated between the layers 42 of the laminated object 40 have been removed.

Process 1: The mold is photographed with a digital camera in a horizontal direction while putting a glass scale on a side surface of the mold.

Process 2: The photograph is analyzed with a computer to measure the number of pixels corresponding to a depth of a recessed part of a level difference generated between layers on the side surface.

Process 3: In the photograph, the number of pixels corresponding to 1 mm of the glass scale and that corresponding to the depth of the recessed part are compared to calculate the depth of the recessed part.

Process 4: The processes II and III are repeated to measure the depths of 10 recessed parts and average the measured 10 values.

EXAMPLE 1

An aqueous solution of poloxamer 407 having a sol-gel transition temperature of 15° C., the concentration of which had been adjusted, was discharged onto the stage 20 maintained at 40° C. with the dispenser 35 equipped with a tapered polyethylene nozzle having a nozzle inner diameter of 610 μm. Thus, a cylindrical laminated object 40 of a mold-forming gel having an inner diameter of 18 mm, an outer diameter of 23 mm, and a height of 17 mm was formed.

The laminated object 40 thus obtained had a cross-sectional view illustrated in FIG. 4. The depth of the recessed part of the level difference between the layers 42 was 250 μm.

The laminated object 40 was thereafter remained cooled to 10° C. for 2 minutes by a jet cooler so that the level differences between the layers 42 were removed. In the resulting mold, the depth of the recessed part of the level difference between the layers 42 was 100 μm.

Thus, it was confirmed that the level differences between the layers 42 of the laminated object 40 were removed by temporal cooling of the laminated object 40. The process of removing level differences improves dimension accuracy of the resulting mold.

Second Embodiment

In the second embodiment, a mold is made from a polymer solution having a sol-gel transition temperature higher than the room temperature. The polymer solution is in a sol state when being discharged.

A mold making apparatus according to the second embodiment includes an additive manufacturing device and a laminated object cooler.

Figure 7:
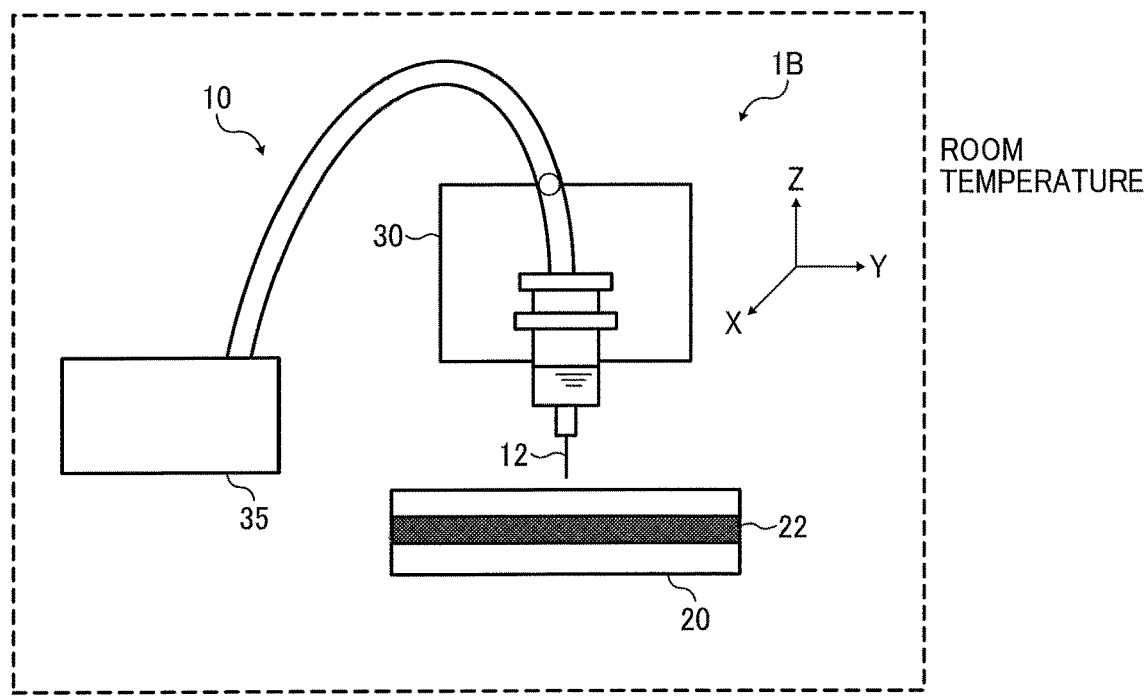
FIG. 7 is a schematic view of an additive manufacturing device that performs a method for making a mold according to a second embodiment of the present invention.

FIG. 7 is a schematic view of an additive manufacturing device 1B that performs a method for making a mold according to the second embodiment of the present invention.

The additive manufacturing device 1B includes a liquid droplet discharge unit 10, a stage 20, a driver 30, and a heater 22. The liquid droplet discharge unit 10 includes a liquid droplet discharger 12 for discharging a polymer solution onto the stage 20. The driver 30 relatively moves the liquid droplet discharger 12 and the stage 20. The heater 22 heats the polymer solution discharged onto the stage 20 to cause the polymer solution to gelate.

The stage 20 and the driver 30 have the same configurations as those of the first embodiment. The liquid droplet discharge unit 10 may have the same configuration as that of the first embodiment or an inkjet configuration.

The heater 22 is configured to heat the stage 20. In particular, the heater 22 can maintain the temperature of the upper surface of the stage 20 at the sol-gel transition temperature of the polymer solution or higher. Specific examples of the heater 22 include, but are not limited to, a conductive heater, a thermostatic chamber, a radiative heater, a heat exchanger, and a Peltier element.

A method for forming the laminated object 40 of a mold-forming gel is described in detail below.

The laminated object 40 of a mold-forming gel is formed by the following processes 1 to 5.

Process 1: A polymer solution in a sol state at room temperature is discharged from the liquid droplet discharge unit 10 onto the stage 20.

Process 2: The polymer solution discharged onto the stage 20 is heated by the heater 22 to gelate.

Process 3: The liquid droplet discharger 12 and the stage 20 are relatively moved in a horizontal direction by the driver 30.

Process 4: A layer 42 of a mold-foaming gel, having a shape corresponding to a locus of the relative movement, is formed on the stage 20.

Process 5: The driver 30 is operated such that the polymer solution is further discharged onto the layer 42 of the mold-forming gel to laminate another layer of the mold-forming gel. Each layer 42 of the mold-forming gel includes a portion where nothing is formed, as the polymer solution is not discharged to a specified region inside the outer periphery of each layer 42, when forming each layer 42 of the mold-forming gel.

As the processes 1 to 5 are repeated, multiple layers 42 of the mold-forming gel are laminated on one another, thereby forming a laminated object 40 of the mold-forming gel having a hollow structure.

A method for removing level differences between the layers 42 of the laminated object 40 is described below.

First, the laminated object 40 of the mold-forming gel formed by the additive manufacturing device 1B is maintained at the sol-gel transition temperature or higher on the stage 20.

Next, the laminated object cooler temporarily cools a surface part of the laminated object 40 of the mold-forming gel to the sol-gel transition temperature or lower, to make the surface part of the laminated object 40 into a sol. The solated surface part flows downward by gravity and fills the level differences between the laminated layers 42 of the mold-forming gel.

The laminated object 40 of the mold-forming gel is thereafter reheated to a temperature higher than the sol-gel transition temperature, so that the solated surface of the laminated object 40 becomes a gel again. Thus, the level differences between the laminated layers 42 are removed.

The cooling process is the same as that in the first embodiment. The process of making the solated polymer solution into a gel again is performed by the heater 22. Preferably, the cooling time is within the range of 5 seconds to 10 minutes, as is the same as in the first embodiment. More preferably, the cooling time is within the range of 10 seconds to 5 minutes.

The mold formed according to the second embodiment has a shape similar to that formed according to the first embodiment.

EXAMPLE 2

An aqueous solution of poloxamer 407 having a sol-gel transition temperature of 25° C., the concentration of which had been adjusted, was discharged onto the stage 20 heated at 40° C. with the dispenser 35 equipped with a stainless-steel needle having an inner diameter of 0.61 mm. Thus, a cylindrical laminated object 40 of a mold-forming gel having an inner diameter of 18 mm, an outer diameter of 23 mm, and a height of 17 mm was formed.

Before cooling the laminated object 40 to 10° C. for 2 minutes by a jet cooler so that the level differences between the layers 42 were removed, the depth of a recessed part of a level difference between the layers 42 was 280 μm. The depth of the recessed part became 100 μm after the cooling.

Thus, it was confirmed that the level differences between the layers 42 of the laminated object 40 were removed even when the sol-gel transition temperature of the polymer solution was higher than the room temperature.

Third Embodiment

In the third embodiment, a mold can be made regardless of whether the sol-gel transition temperature of the polymer solution is higher or lower than the room temperature, since the temperature of the atmosphere is set higher than the sol-gel transition temperature. In the present disclosure, the "atmosphere" refers to the air surrounding the additive manufacturing device. In the third and fourth embodiments in which a thermostatic chamber is used, the "atmosphere" refers to the air that is temperature-controlled within the internal space of the thermostatic chamber.

Figure 8:
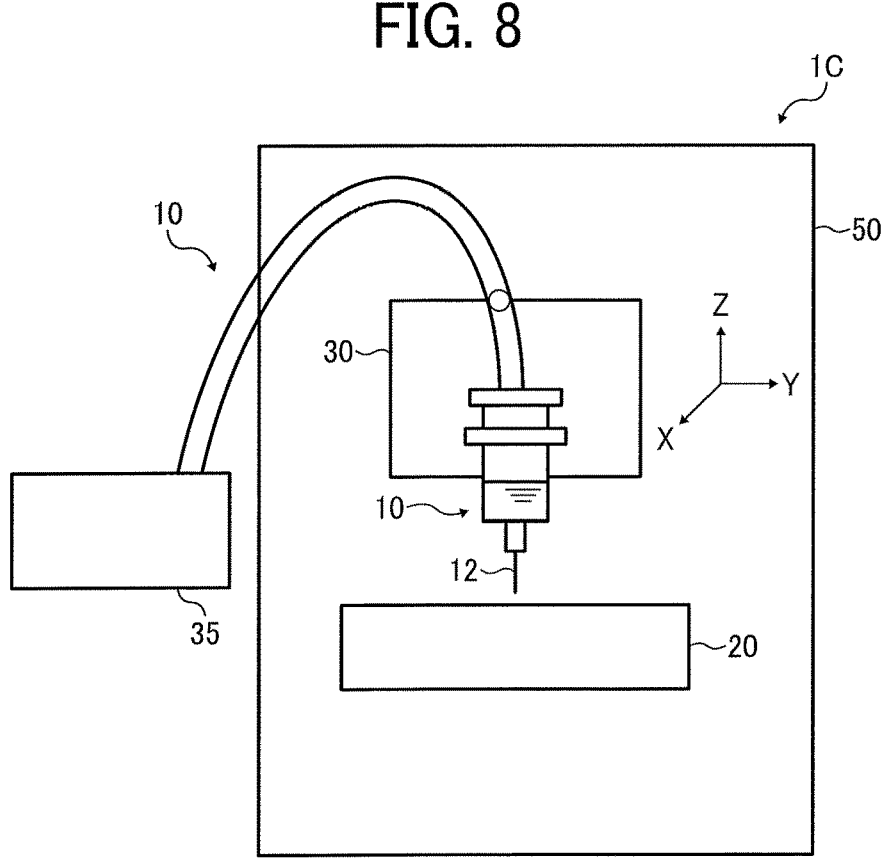
FIG. 8 is a schematic view of an additive manufacturing device that performs a method for making a mold according to a third embodiment of the present invention.

FIG. 8 s a schematic view of an additive manufacturing device 1C that performs a method for making a mold according to the third embodiment of the present invention.

The additive manufacturing device 1C includes a liquid droplet discharge unit 10, a stage 20, a driver 30, and a thermostatic chamber 50. The liquid droplet discharge unit 10 includes a liquid droplet discharger 12 for discharging a polymer solution onto the stage 20. The driver 30 relatively moves the liquid droplet discharger 12 and the stage 20.

The thermostatic chamber 50 is configured to maintain the internal space temperature constant. The internal space temperature of the thermostatic chamber 50 is set and maintained at the sol-gel transition temperature of the polymer solution or higher, to maintain the polymer solution in the liquid droplet discharger 12 or on the stage 20 in a gel state.

The liquid droplet discharge unit 10, the stage 20, and the driver 30 are the same as those of the first embodiment. The third embodiment is different from the first embodiment in that at least the stage 20, the driver 30, and the liquid droplet discharger 12 of the liquid droplet discharge unit 10 are stored in the thermostatic chamber 50.

The laminated object cooler and the laminated object forming part in the additive manufacturing device 1C are the same as those in the additive manufacturing device 1A according to the first embodiment.

In the additive manufacturing device 1C, a polymer solution in a gel state, maintained at the sol-gel transition temperature or higher, is discharged onto the stage 20. Since both the temperature of the stage 20 and the internal space temperature of the thermostatic chamber 50 are set higher than the sol-gel transition temperature, the discharged polymer solution is maintained in a gel state.

A method for removing level differences between the layers 42 of the laminated object 40 is the same as those of the first and second embodiments.

EXAMPLE 3

In the thermostatic chamber 50 maintaining the internal space temperature at 40° C., an aqueous solution of poloxamer 407 having a sol-gel transition temperature of 25° C., the concentration of which had been adjusted, was discharged onto the stage 20 with the dispenser 35 equipped with a tapered polyethylene nozzle having a nozzle inner diameter of 0.61 mm. Thus, a cylindrical laminated object 40 of a mold-forming gel having an inner diameter of 18 mm, an outer diameter of 23 mm, and a height of 17 mm was formed.

Before cooling the laminated object 40 to 10° C. for 2 minutes by a jet cooler so that the level differences between the layers 42 were removed, the depth of a recessed part of a level difference between the layers 42 was 250 μm. The depth of the recessed part became 100 μm after the cooling.

In the second embodiment, a polymer solution is discharged in a sol state, and the stage 20 is heated to cause the laminated object 40 to gelate. Therefore, the temperatures of upper layers are more likely to decline than the temperatures of lower layers. As the laminated object 40 gains height, upper layers take a much longer time until becoming a gel. This means that it takes a much longer time to laminate one layer on another.

By contrast, in the third embodiment, since the atmospheric temperature is set higher than the sol-gel transition temperature of the polymer solution, the polymer solution remains in a gel state when being discharged regardless of the sol-gel transition temperature thereof. Thus, the time for laminating one layer on another is constant regardless of the height of the resulting laminated object.

According to the third embodiment, a mold can be made regardless of whether the sol-gel transition temperature of the polymer solution is higher or lower than the room temperature.

Fourth Embodiment

In the fourth embodiment, a mold having a narrow injection port can be formed. If such a mold is made by the methods described above, it will be difficult to cool the inner wall surface of the laminated object in the cooling process. The additive manufacturing device 1C used in the third embodiment is also used in the fourth embodiment.

In the fourth embodiment, a mold is made by laminating layers of a gel through the following processes 1 to 4.

Process 1: At least one layer of a gel is formed on the stage 20.

Figure 9:
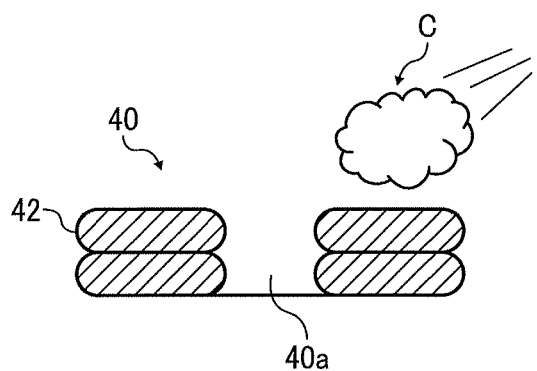
FIG. 9 is a cross-sectional view of a laminated object obtained by laminating layers of a gel on a stage.
Figure 10:
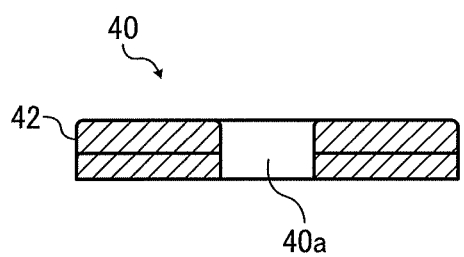
FIG. 10 is a cross-sectional view of the laminated object illustrated in FIG. 9 from which level differences between laminated layers have been removed.

FIG. 9 is a cross-sectional view of the laminated object 40 obtained by laminating several layers of a gel on the stage 20.

Process 2: The surface of the laminated object 40 is cooled with cold air C so that level differences between the layers 42 are removed.

FIG. 6 is a cross-sectional view of the laminated object 40 from which level differences between layers 42 have been removed by exposing the surface of the laminated object 40 to cold air.

Process 3: At least one layer of the gel is further laminated on the layers that have already been laminated.

Figure 11:
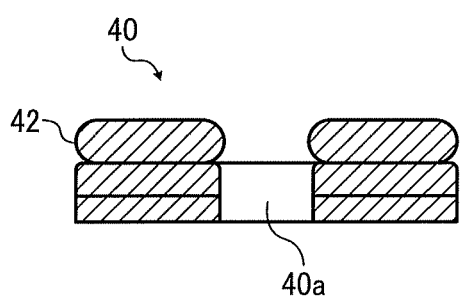
FIG. 11 is a cross-sectional view of the laminated object illustrated in FIG. 10 having an additionally-laminated layer of the gel on the top.

FIG. 11 is a cross-sectional view of the laminated object 40 having an additionally-laminated layer of the gel on the top.

Process 4: The surface at around the top layer of the laminated layers 42 is cooled so that level differences between the layers 42 are removed.

Figure 12:
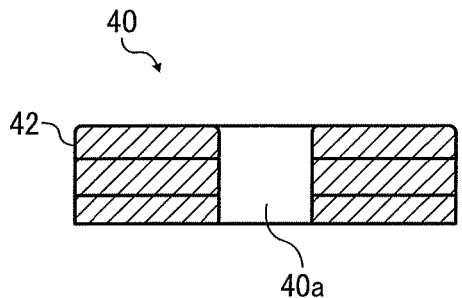
FIG. 12 is a cross-sectional view of the laminated object illustrated in FIG. 11 from which level differences between laminated layers have been removed.

FIG. 12 is a cross-sectional view of the laminated object 40 from which level differences between the layers 42 have been removed by exposing the surface at around the top layer of the laminated layers 42 to cold air.

As the processes 1 to 4 are repeated, a mold can be formed.

EXAMPLE 4

In the thermostatic chamber 50 maintaining the internal space temperature at 40° C., an aqueous solution of poloxamer 407 having a sol-gel transition temperature of 25° C., the concentration of which had been adjusted, was discharged onto the stage 20 with the dispenser 35 equipped with a tapered polyethylene nozzle having a nozzle inner diameter of 0.61 mm Every time three layers of a gel had been laminated, the laminated layers were cooled to 10° C. for 30 seconds by a jet cooler so that level differences between the layers 42 were removed. As a result, a cylindrical mold having an inner diameter of 18 mm, an outer diameter of 23 mm, and a height of 17 mm was formed. The depth of the recessed part of the level difference between the layers 42 was 110 μm.

In the fourth embodiment, level differences between the layers 42 have already been removed at the time when lamination of gel layers is completed. In the cooling process, the surface at around the top layer of the laminated layers 42 is always cooled. Therefore, it is possible to reliably cool the laminated layers regardless of the size and shape of the injection port.

A method for injecting a model material into a mold is described below.

Figure 13:
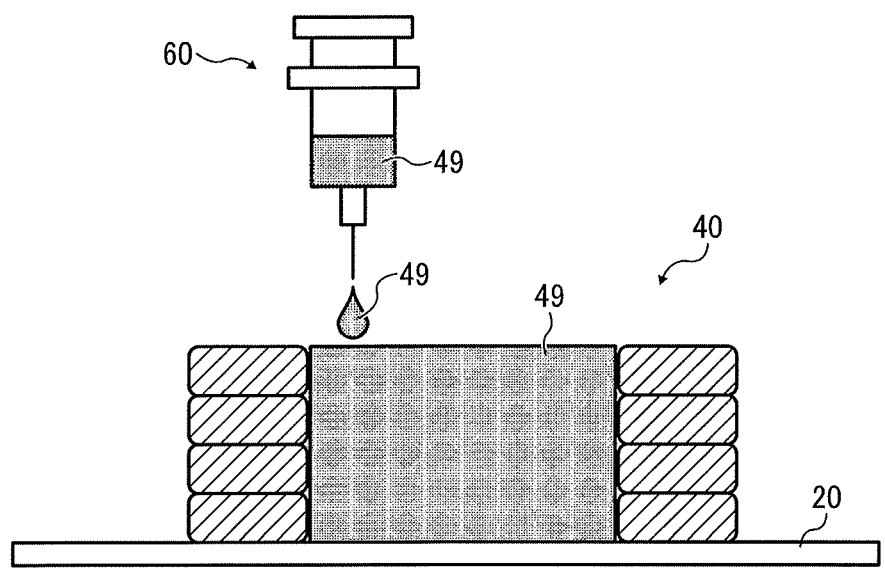
FIG. 13 is an illustration of a method for injecting a solution of a model material into a mold made by a method according to an embodiment of the present invention.

Referring to FIG. 13, while a mold, i.e., the laminated object 40 of a temperature-responsive hydrogel, is maintained at the sol-gel transition temperature or higher, a model material 49 in a liquid state that has not been hardened yet is injected into an opening of the mold.

The mold is maintained at the sol-gel transition temperature or higher is the same manner as in the additive manufacturing process of the mold. An injector 60 injects the model material 49 in a liquid state into the mold. Specific examples of the injector 60 include, but are not limited to, a pipette, a dropper, a syringe, a pneumatic dispenser, and an inkjet mechanism.

A method for hardening (solidifying) the model material is described below.

Examples of the model material include materials hardenable at a temperature equal to or higher than the sol-gel transition temperature of the mold-forming gel. The model material may contain solid matters (e.g., particles) dispersed therein.

The model material may be hardenable by means of, for example, radiation, UV (ultraviolet) irradiation, or addition of cross-linker. Specific examples of the model material hardenable by radiation include, but are not limited to, agarose gel, carrageenan gel, and gelatin gel. Such a gel may gelate as being heated to the dissolution temperature or higher to dissolve and then injected into the mold to radiate heat until the temperature becomes equal to that of the mold.

Specific examples of the model material hardenable by UV irradiation include, but are not limited to, PDMS (polydimethylsiloxane).

One example of the model material hardenable by addition of cross-linker includes an aqueous solution of sodium alginate that is hardenable by addition of calcium chloride. Another example includes an aqueous solution of polyvinyl alcohol that is hardenable by addition of borax.

It is possible to add a cross-linker to the model material prior to injection of the model material into the mold, and to cause the model material to gradually harden after the injection. Specific examples of the model material further include alginate impression material that is a powdery mixture of sodium alginate, a poorly-soluble calcium salt, and a chelating agent. Alginate impression material has a property of gradually hardening within several minutes to several tens of minutes after being mixed with water. Thus, the alginate impression material may be hardened by being injected into the mold immediately after being mixed with water and left at rest for several minutes to several tens of minutes.

Figure 14:
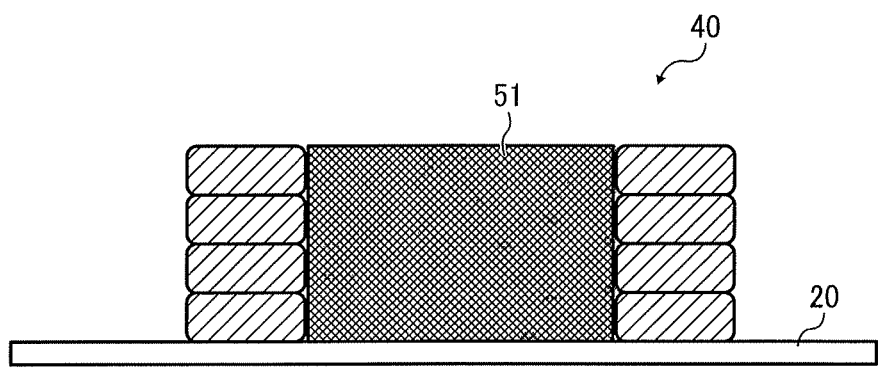
FIG. 14 is an illustration of the model material illustrated in FIG. 13 that has been hardened.

The method for making a mold according to some embodiments of the present invention is effective for brittle model materials, but may be applied to any model material hardenable by any method. FIG. 14 is a cross sectional view of a model material 51 hardened in the mold (i.e., the laminated object 40).

A method for releasing the model material having formed into a desired shape from the mold is described below.

Figure 15:
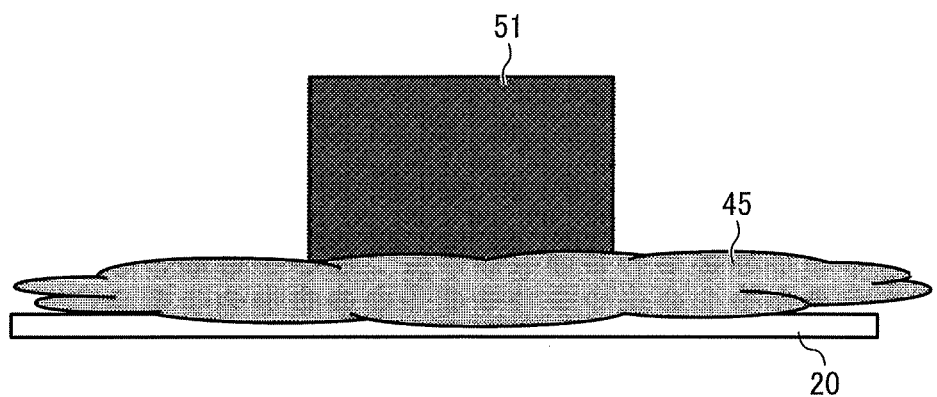
FIG. 15 is an illustration of a method for extracting the hardened model material illustrated in FIG. 14 that has been molded into a desired shape.

The model material can be released from the mold by mechanical methods or solation methods. In mechanical methods, the mold can be mechanically removed with tweezers or a trowel, owing to brittleness and plasticity of the mold. However, in such mechanical methods, a kinetic load is disadvantageously applied to the model material. Therefore, solation methods, in which the mold is cooled to solate, are more preferable. In solation methods, the mold is cooled to below the solation temperature of the mold-forming gel, since the mold-forming gel is formed of a temperature-responsive sol-gel transition material. As a result, the mold undergoes solation and becomes a sol 45, and the sol 45 flows out, as illustrated in FIG. 15.

The mold may be cooled by, for example, storing the mold in a refrigerator or freezer, bringing a cooling substance into contact with the mold, or dipping the mold in water.

In such solation methods, the mold (i.e., the laminated object 40 of the mold-forming gel) can be easily removed without applying a kinetic load to the model material 51.

EXAMPLE 5

Poloxamer 407 (KOLLIPHOR P407 available from BASF Japan Ltd.), serving as a temperature-responsive hydrogel-forming polymer, was dissolved in pure water remained at 10° C. or lower in a beaker cooled with surrounding ice cubes. Thus, an aqueous solution A was prepared. The concentration of poloxamer 407 in the aqueous solution A was 25% by weight.

The sol-gel transition temperature of the aqueous solution A was 15° C. The aqueous solution A was heated to 37° C., thus obtaining a transparent gel.

The aqueous solution A having a temperature of 4° C. was filled in a 10-mL syringe. The syringe was attached to a syringe nozzle (available from Musashi Engineering, Inc.) having a tip inner diameter of 250 μm. The syringe was left at rest for 10 minutes under a room temperature of 20° C. to cause the aqueous solution A to gelate. The syringe was compressed with a pneumatic dispenser (ML-5000XII available from Musashi Engineering, Inc.) so that the gel of the aqueous solution A was discharged from the tip of the syringe nozzle.

Figure 16:
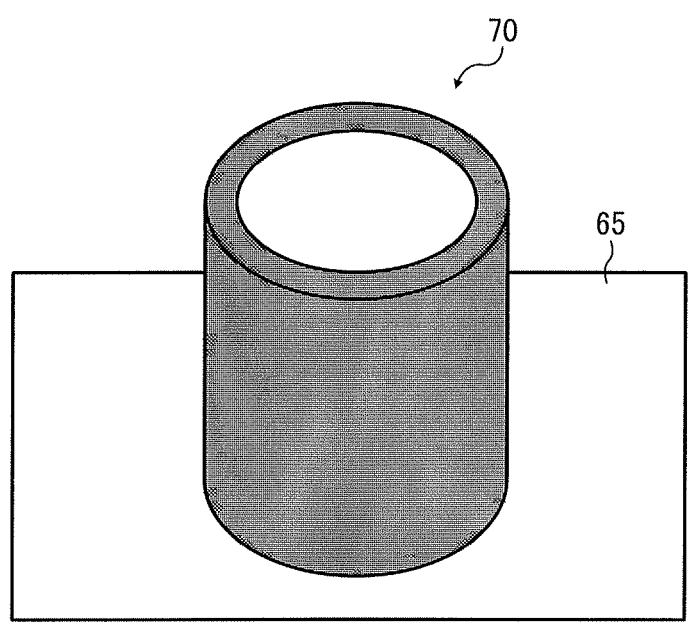
FIG. 16 is a schematic view of a mold formed of a gel, made by a method according to an embodiment of the present invention.

A stage covered with a PET (polyethylene terephthalate) film was set below the syringe nozzle. The stage and the syringe were then relatively moved so that the gel of the aqueous solution A was discharged onto the PET film As a result, a mold 70 was formed on a PET film 65, as illustrated in FIG. 16. The mold 70 was in a cylindrical shape having an outer diameter of 6.0 mm, a thickness of 1.5 mm, and a height of 10 mm Next, κ-carrageenan (CSK-01 available from Sansho Co., Ltd.) was dissolved in water having a temperature of 70° C. Thus, an aqueous solution B was prepared. The concentration of κ-carrageenan in the aqueous solution B was 2% by weight.

A part of the aqueous solution B was cooled to 40° C., injected into the opening of the mold 70 (i.e., a structural body formed of the gel of the aqueous solution A) with a dropper, and left at rest for 30 minutes under the room temperature, thereby causing the aqueous solution B to undergo gelation.

Figure 17:
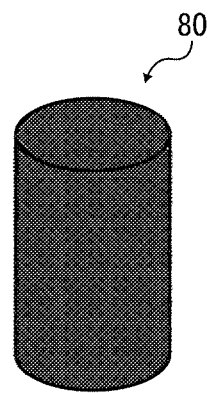
FIG. 17 is a schematic view of an object molded by the mold illustrated in FIG. 16.

A cylindrical structural body D that is a combination of the mold 70 and the molded object, along with the PET film 65, was stored in a refrigerator at 4° C. for 2 hours. As a result, a molded object 80 formed of the gel of the aqueous solution B was obtained, as illustrated in FIG. 17. The molded object 80 was in a cylindrical shape having an outer diameter of 3 mm and a height of 10 mm.

According to Example 5, a model material can be molded with a mold formed of a temperature-responsive hydrogel.

EXAMPLE 6

The aqueous solution A cooled to 10° C. or lower was filled in a 10-mL syringe under a room temperature of 20° C. The syringe was attached to a syringe nozzle (available from Musashi Engineering, Inc.) having a tip inner diameter of 250 μm. The syringe was left at rest for 10 minutes under the room temperature to cause the aqueous solution A to gelate. The syringe was compressed with a pneumatic dispenser (ML-5000XII available from Musashi Engineering, Inc.) so that the gel of the aqueous solution A was discharged from the tip of the syringe nozzle.

Figure 18:
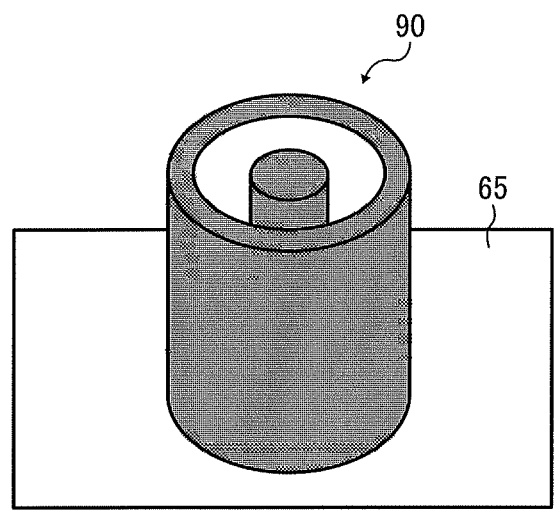
FIG. 18 is a schematic view of a mold formed of a gel, made by a method according to another embodiment of the present invention.

A stage covered with a PET film was set below the syringe nozzle. The stage and the syringe were then relatively moved so that the gel of the aqueous solution A was discharged onto the PET film. As a result, a mold 90 was formed on a PET film 65, as illustrated in FIG. 18. The mold 90 was in a shape having a cylindrical part and a columnar part. The cylindrical part had an outer diameter of 18 mm and a thickness of 3 mm. The columnar part had an outer diameter of 6 mm. The overall height of the mold 90 was 10 mm.

Next, 5 parts of a 2 wt % aqueous solution of sodium alginate (IL-2 available from KIMICA Corporation), 1 part of a 2 wt % aqueous solution of dicalcium phosphate, 1 part of a 4 wt % aqueous solution of citric acid, and 1 part of a polyacrylic particle (MX-1000 available from Soken Chemical & Engineering Co., Ltd.) having a diameter of 10 μm were mixed. Thus, an aqueous solution E, serving as a model material, was prepared. (Here, "wt %" represents "% by weight".)

The aqueous solution E was immediately injected into a gap between the cylindrical part and the columnar part of the mold 90 (i.e., a structural body formed of the gel of the aqueous solution A) with a dropper, and left at rest for 15 minutes under the room temperature, thereby hardening the aqueous solution E.

The mold 90 (i.e., a structural body formed of the gel of the aqueous solution A) and the hardened aqueous solution E, along with the PET film 65, were immersed in cold water having a temperature of 4° C. After being left at rest for 30 minutes, the hardened body of the aqueous solution E was taken out of the mold 90.

Figure 19:
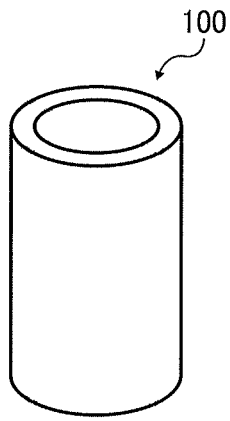
FIG. 19 is a schematic view of an object molded by the mold illustrated in FIG. 18.

As a result, a molded object 100 formed of the hardened body of the aqueous solution E was obtained, as illustrated in FIG. 19.

The molded object 100 was in a cylindrical shape having an outer diameter of 12 mm, an inner diameter of 6 mm, and a height of 10 mm. The cylindrical molded object 100 was a clouded body in which the polyacrylic particles were dispersed in the hydrogel of alginic acid.

In accordance with some embodiments of the present invention, a mold made of a temperature-responsive hydrogel can be formed on demand. By using this mold, a brittle model material can be molded on demand. The mold can be released from the model material just by being cooled, without applying a kinetic load to the model material. In a case in which the model material in a liquid state contains particles, the particles are dispersed or precipitated in the resulting molded object. Since the mold is formed of laminated gel layers, level differences between gel layers may appear on the surface of the mold. As a part of the laminated gel layers is made into a sol, the sol (polymer solution) fills level differences between the laminated gel layers on the surface of the mold to eliminate the level differences. Thus, the inner wall surface of the mold is made flat and dimension accuracy of the mold is improved. The mold can be made by discharging a polymer solution in a gel state and laminating layers of the gel. The mold can also be made by discharging a polymer solution in a sol state, making the sol into a gel thereafter, and laminating layer of the gel. The laminated object of the gel is temporarily cooled to a temperature equal to or higher than 0° C. and lower than the sol-gel transition temperature by 5° C. or more, each time after each layer is laminated and/or after multiple layers have been laminated, to make a surface part of the laminated object into a sol without freezing, thereby improving dimension accuracy of the mold. The laminated object of the gel is temporarily cooled for a time within a range of 5 seconds to 10 minutes, each time after each layer is laminated and/or after multiple layers have been laminated, to make a surface part of the laminated object into a sol without destroying the whole laminated object of the gel by excessive cooling, thereby improving dimension accuracy of the mold. The laminated object of the gel may be cooled to the sol-gel transition temperature or lower by being exposed to cold air, stored in a refrigerator, brought into contact with a cooled trowel, or removed from the stage to be exposed to a room temperature, thereby improving dimension accuracy of the mold. The laminated object of the gel may also be cooled with cold air from a jet cooler, even when the mold has a complicated shape, thereby improving dimension accuracy of the mold. When the sol-gel transition temperature of the polymer solution is higher than room temperature, the polymer solution is heated after being discharged and made into a gel, and layers of the gel are laminated. The mold made of a gel can be formed with an additive manufacturing device including a liquid droplet discharger, a stage, and a driver that relatively moves the liquid droplet discharge and the stage. The mold made by additive manufacturing can be temporarily made into a sol with a laminated object cooler, thereby improving dimension accuracy of the mold.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A method for making a mold having a cavity into which a liquid model material is to be injected to create a molded object, comprising:
preparing a polymer solution to have a sol-gel transition temperature. above which the model material is hardenable, by varying a concentration of materials in the polymer solution;
first discharging the polymer solution, in a gel state at a solution temperature equal to or higher than the sol-gel transition temperature, from a liquid droplet discharger onto a stage maintained at a stage temperature higher than the sol-gel transition temperature, the polymer solution solacing at a temperature lower than the sol-gel transition temperature and gelating at a temperature higher than the sol-gel transition temperature;
maintaining the polymer solution discharged onto the stage at a temperature higher than the sol-gel transition temperature
relatively moving the liquid droplet discharger and the stage to foist, on the stage, a gel layer having a closed-path shape corresponding to a locus of the relative movement;
temporarily cooling part of the mold to a temperature lower than the sol-gel transition temperature by 5° C. or more for a time in a range of from 5 seconds to 10 minutes; reheating and maintaining the gel layer at a temperature equal to or higher than the sol-gel transition temperature; and
second discharging the polymer solution from the liquid droplet discharger onto the reheated gel layer to laminate at least another gel layer thereon to obtain the mold haying the cavity into which the liquid model material is to be injected and hardened to create the molded object.

2. The method of claim 1, further comprising:
temporarily cooling a the part of the mold, each time after the second discharging step is performed and/or after the second discharging step is performed multiple times.

3. The method of claim 2, wherein, in the cooling step, the part of the mold is made into a sol to remove level differences between the laminated gel layers.

4. The method of claim 1, further comprising temporarily cooling the part of the mold by being exposed to cold air, stored in a refrigerator, brought into contact with a cooled trowel, or removed from the stage to he exposed to a room temperature.

5. The method of claim 1, further comprising temporarily cooling the part of the mold with a jet cooler using compressed air.

6. The method of claim 1, wherein, in the maintaining step, the polymer solution discharged onto the stage is heated with at least one of a conductive heater, a thermostatic chamber, a radiative heater, a heat exchanger, and a Peltier element, to gelate or to remain in a gel state.

7. A method for molding a model material, comprising:
making a mold by the method according to claim 1;
injecting a model material in a liquid state into the mold;
solidifying the model material; and
releasing the solidified model material from the mold.

8. The method of claim 7, wherein, in the releasing step, the mold cooled to become a sol.

9. The method of claim 7, wherein the model material in a liquid state contains particles.

10. The method of claim 1, wherein the moving step further comprises relatively moving the liquid droplet discharge and the stage so that the gel layer has the closed-path shape, which is a circle.

11. The method of claim 1, wherein the preparing step further comprises varying types of additives in the polymer solution.

* * * * *